(12) United States Patent
Schuessler

(10) Patent No.: US 6,631,843 B2
(45) Date of Patent: Oct. 14, 2003

(54) COMPOSITE CODE SYMBOLOGY

(75) Inventor: Frederick Schuessler, Baiting Hollow, NY (US)

(73) Assignee: Symbol Technologies, Inc., Holtsville, NY (US)

(*) Notice: Subject to any disclaimer, the term of this patent is extended or adjusted under 35 U.S.C. 154(b) by 145 days.

(21) Appl. No.: 09/788,935

(22) Filed: Feb. 20, 2001

(65) Prior Publication Data

US 2001/0045461 A1 Nov. 29, 2001

Related U.S. Application Data

(60) Provisional application No. 60/183,509, filed on Feb. 18, 2000.

(51) Int. Cl.⁷ .................................................. G06K 7/10
(52) U.S. Cl. ............ 235/462.07; 235/494; 235/462.01; 235/462.07; 235/456; 235/436
(58) Field of Search ............................ 235/494, 462.07, 235/456, 462.01, 462.09, 462.02, 462.03, 436, 462.7

(56) References Cited

U.S. PATENT DOCUMENTS

| | | | | |
|---|---|---|---|---|
| 4,766,301 A | * | 8/1988 | Evers | 235/487 |
| 4,980,544 A | * | 12/1990 | Winter | 235/436 |
| 5,541,396 A | * | 7/1996 | Rentsch | 235/454 |
| 5,548,110 A | * | 8/1996 | Storch et al. | 235/462.07 |
| 5,710,417 A | * | 1/1998 | Joseph et al. | 235/462.11 |
| 5,811,787 A | * | 9/1998 | Schuessler et al. | 235/437 |
| 5,966,463 A | * | 10/1999 | Wang | 235/462.15 |
| 5,979,763 A | * | 11/1999 | Wang et al. | 235/462.16 |
| 6,066,857 A | * | 5/2000 | Fantone et al. | 235/462.22 |
| 6,098,892 A | * | 8/2000 | Peoples, Jr. | 235/462.01 |
| 6,267,296 B1 | * | 7/2001 | Ooshima et al. | 235/487 |
| 6,321,986 B1 | * | 11/2001 | Ackley | 235/462.01 |
| 6,398,117 B1 | * | 6/2002 | Oakeson et al. | 235/456 |

* cited by examiner

Primary Examiner—Michael G. Lee
Assistant Examiner—Kim Nguyen
(74) Attorney, Agent, or Firm—Kirschstein et al.

(57) ABSTRACT

The present invention relates to a new composite code symbology having two differently encoded information portions positioned adjacent to each other. The linking between the two portions is achieved by external link-flag that is adjacent to at least one of the encoded portions. The link-flag can extent past one or both of the encoded portions in order to enable skewed scanning of the composite label. Methods for encoding and decoding of the invented composite code that are read by optical readers are presented.

20 Claims, 2 Drawing Sheets

COMPOSITE CODE SYMBOLOGY

CROSS REFERENCE TO RELATED APPLICATIONS

This application derives priority from U.S. Provisional Application Ser. No. 60/183,509, filed on Feb. 18, 2000, which is incorporated herein by reference.

FIELD OF THE INVENTION

The present invention relates to a composite code having two parts encoded using different coding schemes and located adjacent to each other. The two parts are associated by a link-flag adjacent at least one of the two parts.

BACKGROUND OF THE INVENTION

Bar Code Symbology

Optically encoded indicia, such as bar codes are well known in the art. Today, bar codes are used in just about every type of business application: point-of-sale, retail, warehousing, etc. Bar codes are printed on substrates, individual items and on containers enclosing a number of items. Bar codes carry information encoded into bars and spaces of various width, arranged in a predetermined patterns. The bars and spaces are made up of unit elements called modules. A module has a specified height and width. Width is usually called the horizontal dimension of the module. When a bar code is scanned by a laser scanner, bar code modules are usually crossed by the scanning beam along its horizontal dimension. The relative size of a bar coded label is determined by the type of coding used, as are the actual sizes of the label's individual bars and spaces. The size of the bar code is also directly proportional to the amount of information that is stored in that bar code. Conversely, the amount of information is constrained by the size limitations on the bar code. Bar codes usually get scanned via a bar code scanning system, and the encoded information gets extracted and decoded by the system's processing means. Bar code reading can be accomplished by scanning across the bar code with a laser scanner, a wand, a charged coupled device (CCD), or some other solid-state imaging device (SSI). Bar code reading systems are known in the art and have been disclosed, for example, in U.S. Pat. Nos. 4,251,798; 4,360,798; 4,369,361; 4,387,297; 4,409,470 and 4,460,120 and are incorporated by reference herein.

A number of different one-dimensional (1-D) bar code symbologies (encodation schemes) exist. These symbologies include UPC/EAN, Code 39, Code 128, Codabar and Interleaved 2 of 5. Due to their low information density storage capacity these types of bar codes can carry only a limited amount of information, on the order often to twenty letters or digits. This information is usually an index to a file or a database where more comprehensive information is stored.

Symbologies of (n,k) Type

Some bar codes are referred to as belonging to the (n,k) family. A code of (n,k) type uniquely represents characters by a string of n modules containing k bars and k spaces. The UPC symbology is an example of a (7,2) code, i.e., n=7 and k=2.

Two-dimensional (2-D) bar codes carry more information per substrate area than linear bar codes. Some two-dimensional bar code symbologies are just an extension of one-dimensional bar codes, in that they are formed by stacking rows of one-dimensional bar codes and typically placing a horizontal line between each row. In order to keep the same vertical dimension of the overall bar code, the height of each row is smaller then the normal height of a one-dimensional bar code. U.S. Pat. No. 4,794,239.

There exists a number of different two-dimensional code symbologies. Some of the symbologies are: Code49, 16K Code, Codabar, Supercode, Matrix code, etc. The PDF417 symbology is one type of two dimensional bar code symbology that is used when we need to encode a greater amount of information within a limited amount of space, thus giving us a higher information density encodation scheme. U.S. Pat. No. 5,304,786 which is incorporated by reference herein. A "stacked" two-dimensional bar code, such as PDF417, uses a row/column spatial arrangement of codewords. The information is usually broken up and encoded into individual "codewords" which, when decoded, are used to recompose the encoded information. PDF417 symbology has a number of variants. MicroPDF417 symbology is one of the variants of PDF417 symbology and is described in detail in AIM International Symbology Specification-MicroPDF417.

Composite Code

When two different symbologies are used to encode different parts of a given data, the resultant symbol is called a Composite code symbol. Thus, a composite symbol is a hybrid consisting of symbols encoded using more than one encoding scheme. For example, a product identification number may be encoded in a 1D bar code and supplementary product information may be encoded in a linked 2D bar code located adjacent the 1D bar code. Many companies would like to adopt Composite (1D/2D hybrid) symbologies, so that they can stay compatible with their installed base of 1D scanners (readers), and upgrade the scanning equipment over time (at their own pace) to also capture supplementary information (such as a serial number) in a linked 2D portion. For this to really work without disrupting the current application, the 1D barcode must remain compatible with "old generation" scanners, while adding an encoded "link flag" so that a "new generation" scanner knows that additional information is printed adjacent (above or below) the 1D bar code symbol. Without a link flag, a scanner (unless it captures a full two-dimensional 2D image) would decode the linear symbol and transmit the data from it, but fail to recognize that additional data was printed in an associated 2D symbol. A standard link flag has been defined for the 2D portion of a composite bar code symbol (for symbologies such as PDF417 and MicroPDF417), so the data encoded in the two-dimensional (2D) portion of a composite bar code won't accidentally be transmitted without the data in the accompanying one-dimensional (linear) bar code. But, linkage in both directions is needed, for a truly robust system.

In particular, UPC/EAN, Code 39, Codabar, and Interleaved 2 of 5 do not provide a means of adding a link flag character without changing the data that an old scanner would transmit.

An optical symbology is needed that provides the means for a code reader to recognize that a 1D code is a part of a composite symbol and that another part of the composite symbol must be adjacent to the 1D code, and that both 1D and 2D bar codes must be decoded in order to obtain full information contained within the composite symbol.

SUMMARY OF THE INVENTION

The present invention solves this problem by printing a link flag character outside of the linear barcode (preferably, immediately adjacent to its trailing white Quiet Zone). An old generation scanner would not decode this character (because it is outside the standard symbol), but a new generation scanner can be reprogrammed to look past the Quiet Zone for an additional character pattern. Different patterns could be assigned (and a list maintained by a standards organization such as AM) to represent different application data sets and rules, and/or to denote which 2D symbology (e.g., PDF417 vs. MicroPDF417) is linked to the accompanying linear symbol.

DETAILED DESCRIPTION OF THE INVENTION

Figure 1:
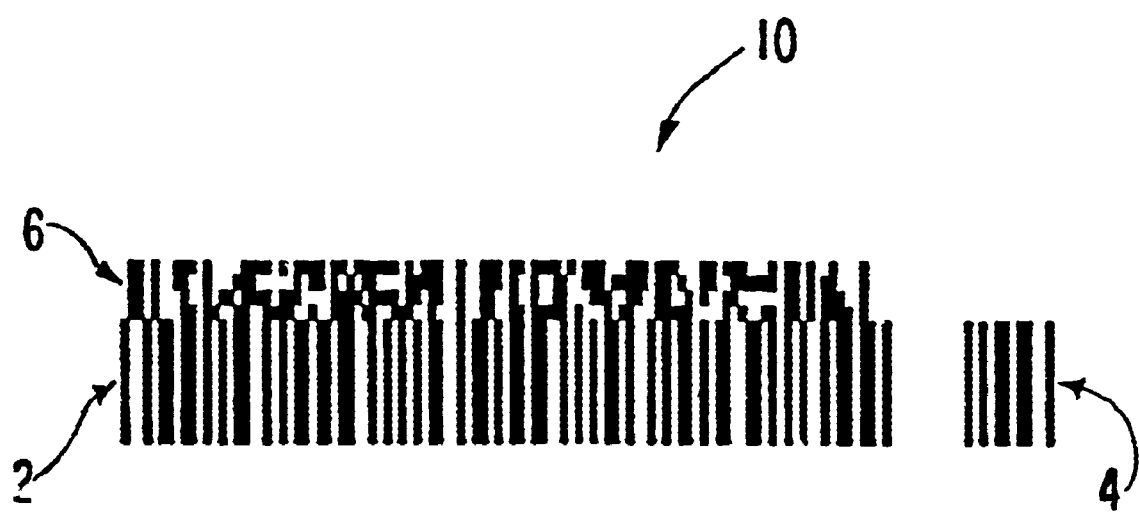
FIG. 1 illustrates a composite code symbol of the preferred embodiment of the present invention including a link-flag.

The preferred embodiment discloses a new composite code symbology in a form of Code 39/MicroPDF417 Composites (1D/2D composite), and the encoding and decoding algorithms for Code 39/McroPDF417 Composites using the Telecommunications Industry Forum (TCIF) application as an example. The TCIF standard specifies how TCIF members can add a Serial Number (and additional supplementary information) to a CLEI-coded product, when that product is currently marked with a Code 39 representation of the common language equipment identification (CLEI) code as a six-digit equipment catalog item (ECI) number. The supplementary information is encoded in a MicroPDF417 symbol that is logically "linked" to the Code 39 symbol, and printed above it. Note that, for a longer linear symbol, a PDF417 could be used above the linear symbol, instead of a MicroPDF417, to most efficiently utilize the area above the linear symbol.

Existing scanning equipment will still be able to scan the CLEI code and transmit the six-digit ECI as before. New scanners can be modified to recover both the CLEI code and the supplementary information, and to transmit the entire data according to predetermined format, for example Format 06 of the ISO/IEC 15434 2D syntax specification, using Federation of Automated Coding Technologies (FACT) Data Identifiers (DI's).

1. Data Format of the Preferred Embodiment

The TCIF's Code 39 Composite application specifies the use of two required data elements, which may optionally be followed by additional data elements.

a six-digit ECI number (representing a CLEI Code). When encoded in a stand-alone Code 39 symbol, it is transmitted verbatim. When encoded in a Code 39 Composite, the transmission of the six-digit number is part of a Format 06 envelope, and the ECI number is prefixed by a pre-assigned Data Identifier. An example of a pre-assigned Data Identifier if 6P.

A Serial Number, prefixed by another Data Identifier of 'S' (predetermined choice, to be decided by TCIF). Note that the use of AI's such as '21' would not be appropriate, because no EAN.UCC primary product identifier is being encoded. This serial number may be alphanumeric, and may be up to 18 characters long (and up to 22 characters long, if starting with a four-character manufacturer code).

Additional data items, such as a Country of Origin, may optionally follow the Serial Number. Any such additional items must each be preceded by an $ASCII^G_S$ character and a Data Identifier.

2. Encoding a Code 39 Composite for the TCIF Application

Special encoding software is required to implement the application-specific rules for use of Code 39 Composites. Encoding software designed for this TCIF application needs to perform the following steps:

Encode the six-digit ECI number as a standard Code 39 symbol (per the AIM USS for Code 39).

If no serial number or other supplemental data is required, then encoding is complete—do not perform the remaining steps of this section.

If supplemental data needs to be encoded, first validate the input data, to ensure that it fully complies with the rules of Section 2 above. If the data matches the TCIF format, proceed with the remaining steps.

Encode a linkage flag immediately to the right of the Code 39 symbol's right Quiet Zone. For the TCIF application, this linkage flag is the single Code 39 symbol character (5 bars and 4 spaces) representing the letter 'T'. An additional Quiet Zone (minimum 1×) is required to the right of this linkage flag. While the preferred embodiment specifies locating the link-flag immediately to the right of the 1D bar code, in another embodiment the link-flag can be positioned anywhere adjacent to the 1D symbol as long as there is no print in between the 1D symbol and the link-flag.

Encode the supplemental data in a four-column MicroPDF417 symbol above the Code 39 symbol. Alignment and spacing between the two components are not critical. To print the smallest possible Composite, the MicroPDF417 symbol can be printed directly adjacent to the top edge of the Code 39 symbol, and the first (leftmost) bar of the MicroPDF417 symbol can be aligned with the first interior space of the Code 39 symbol. The data is encoded into the MicroPDF417 symbol as follows:

Skip the leading Data Identifier 'S', and encode the remaining data into a series of codewords, using the encodation rules specified in MicroPDF417specification, which is incorporated herein by reference.

Encode this series of codewords into a four-column MicroPDF417 symbol whose first codeword is 918 (the linkage flag specified in the AIM Code 93i specification), and whose second codeword is a mode latch to Alpha, Numeric or Byte mode, depending on data content. The MicroPDF417 symbol is encoded according to the AIM specification for MicroPDF417. (Individual parts of the composite code can be printed or etched on a substrate right after being encoded or at the same time with the other parts of the composite code.)

3. Decoding a Code 39 Composite for the TCIF Application

Special decoding software is required to decode a TCIF Code 39 Composite. Decoding software designed for this TCIF application needs to perform the following steps. Note that the first two major steps (decoding the Code 39 symbol, and decoding the MicroPDF417 symbol) may be performed in either order (depending upon where the operator initially aims the scanner).

Decode the Code 39 symbol, and its link flag. This operation consists of the following sub-steps, in the following order:

Find and decode the body of the Code 39 symbol, in accordance with the AIM Code 39 specification.

If the complete decoded message does not consist of a six-digit number, then it is not part of a TCIF Code 39 Composite; transmit it as a standard Code 39 symbol, and do not perform the remaining steps.

If the complete decoded message consists of a six-digit number, then:

look past the symbol's right Quiet Zone. If at least 5 more bars and 5 more spaces are present, attempt to decode these as a single Code 39 character, using the same scan direction that was determined from the body of the symbol. If these bars and spaces represent the letter 'T', then a TCIF Code 39 Composite has been detected. Save the six-digit data, but do not transmit the data until the MicroPDF417 portion of the Composite has also been decoded.

If a 'T' link flag was not decoded next to this six-digit Code 39 symbol, then transmit it as a standard Code 39 symbol, and do not perform the remaining steps. Note: scanners can be programmed to virtually eliminate the possibility of "missing" a printed link flag, by applying this "voting" algorithm:

If the linear symbol is not a 6-digit Code 39, it is not TCIF-Linked; no voting is necessary;

If the decoded symbol is a 6-digit Code 39, increment an "unlinked-39-count", and store the data (but do not transmit it). Acquire another scan line, and repeat this entire set of steps, until either:

a link flag is found (in which case TCIF Code 39 Composite has been detected), or "unlinked-39-count" reaches a predefined limit, such as 3 (in which case the symbol is deemed to be a standard, unlinked, Code 39 symbol).

Decode the MicroPDF417 symbol, and its link flag. This operation consists of the following sub-steps, in the following order:

Find and decode (to the codeword level) the body of the MicroPDF417 symbol, in accordance with the AIM MicroPDF417 specification.

If the first codeword is not 918, then complete the decode process (from codewords to ASCII), and transmit this as a standard MicroPDF417 symbol (or as an EAN.UCC Composite, if the first codeword is 920).

If the first codeword is 918, then a non-EAN.UCC Composite has been detected. Decode the codewords into bytes, per the standard MicroPDF417 procedures, but do not transmit these bytes until the associated linear portion of this Composite has also been decoded.

Combine the data from the linear and MicroPDF417 portions of the Composite. This step is performed after all of the steps above have been completed. Then, perform the following sub-steps:

If the linear symbol was not a six-digit Code 39 with a trailing 'T' link flag, this is not a TCIF Code 39 Composite. Transmit the data according to the relevant symbology and/or application specification(s), and do not perform the remaining sub-steps below.

Transmit the TCIF Code 39 Composite data as a single message, consisting of:

The leading characters of an ISO/IEC 15434 Format 06 message, transmitted as $[)>^R{}_S06^G{}_S$ The ECI code, transmitted as 6P followed by the six digits encoded in the Code 39 symbol $A^G{}_S$ character (to separate this data item from the next), followed by the Data Identifier "S"

The ASCII data that was decoded from the MicroPDF417 symbol.

A trailing $^R{}_S^EO_T$, to complete the ISO/IEC 15434 Format 06 message.

A sample Code 39/MicroPDF417 Composite symbol, conforming to the TCIF application, is shown in FIG. 1 as reference numeral 10. Reference numeral 2 represents a linear portion of the composite bar code 10. The linear portion is encoded using Code39 Symbology. Reference numeral 6 represents an adjacent two-dimensional portion of the composite bar code 10, encode using MicroPDF417 symbology. Reference numeral 4 represents an adjacent link flag.

Only the data encoded in a linear portion of the composite bar code is decoded and transmitted by an old generation scanner. The content of such decoded data is: 239316

The new generation scanner, capable of decoding Code 39 Composite bar codes, will decode both, the data encoded in the 1D potion and the 2D portion of the composite symbol. The content of decoded and transmitted data is:

$[)>^R{}_S06^G{}_S6P239316^G{}_SS12345678901234^R{}_S^EO_T$

4. Additional Techniques Within the Scope of the Invention

Although the implementation described above was specifically tailored to the needs of the TCIF application, many other variations and improvements are possible, especially to broaden the applicability of this idea to other industries and applications. As examples:

This technique, of having a link flag external to the main body of the linear barcode symbol, can be applied to any linear symbology that lacks the inherent ability to encode a link flag. For example:

A single "symbol character" (i.e., a set of bars and spaces defined by the Symbology Specification to represent one or more data characters) could be used as a link flag, in the same manner described above, using Codabar instead of Code 39.

Using Interleaved Two of Five as the linear symbology, a set of 5 bars and 5 spaces, representing any pair of digits from "00" to "99", could be placed after the right quiet zone. In this case, as in the case of many other symbologies such as Code 93, the symbology's "symbol characters" end in a space not a bar, and an extra narrow bar would need to be added to the right of the link flag.

In the Case of UPC-A, UPC-E, EAN-8, or EAN-13 symbologies, a single symbol character consists of only two bars and two spaces, thus it is not unlikely that random graphics patterns or text next to these symbols could accidentally look like a link flag. For symbologies such as these, the link flag could instead be defined as two adjacent symbol characters (four bars and four spaces, plus an extra trailing bar as was needed for Code 93 above). This would create a much stronger pattern for the link flag, making it highly improbable that graphics could accidentally mimic a valid link flag.

This technique, of having a choice of link flags indicate different applications and/or different associated 2D symbols, can be extended as needed. For example, up to 44 different Code 39 Composite applications could be defined by a single Code 39 symbol character used as a link flag. Potentially, each of these applications could define its own rules for allowed data content and transmitted data formatting. Similarly up to 100 different applications could be defined for Interleaved Two of Five Composites. Preferably, these different application assignments would be standardized by an industry standards body (such as AIM, Inc), and a list of the applications and their descriptions made available to all interested parties.

The link flag does not have to be placed to the right of the linear symbol (placing it instead to the left would work equally well).

The 2D component of the Composite does not need to be placed above the linear symbol; it could be printed beneath it, or to the left or right of it. Also, the 1D and the 2D portions of the composite code need not touch each other.

Additional techniques can be applied to improve the robustness of the scheme, to maximize the probability that a scanner will neither a) fail to recognize a link flag that was printed, nor b) accidentally interpret random graphics as a link flag.

Figure 2:
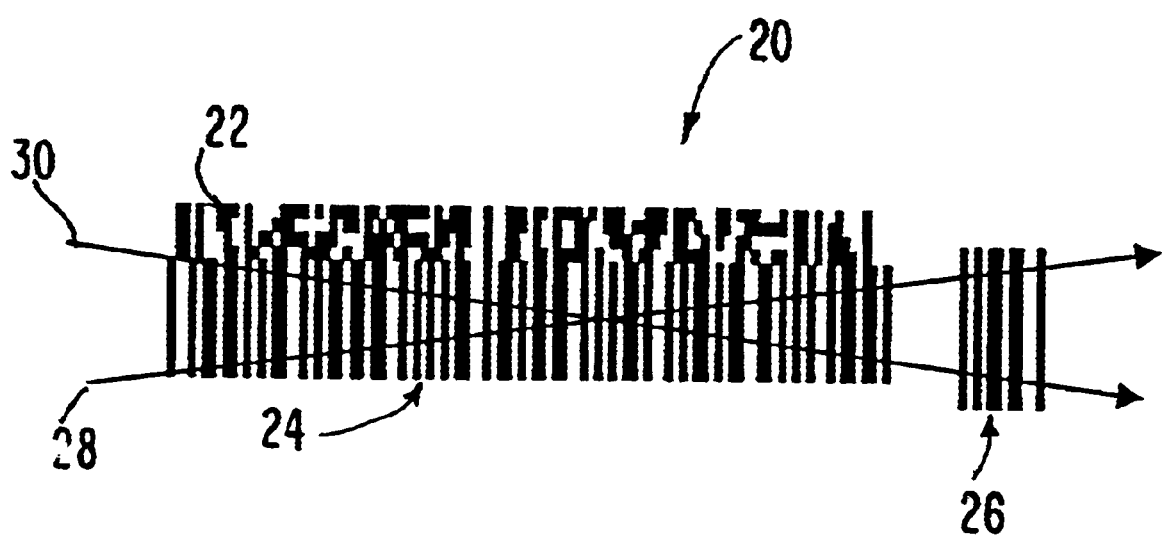
FIG. 2 illustrates a composite code symbol of the preferred embodiment of the present invention including an extended link-flag.

FIG. 2 illustrates an example of improved composite bar code 20 over the composite bar code 10 of FIG. 1. The composite bar code 20 of FIG. 2 has the same two-dimensional and one dimensional portions 22 and 24 as the respective two-dimensional and linear portions 6 and 2 of the composite symbol 10 of FIG. 1. However, the linkage flag character 26 is of a somewhat greater height than the base linear portion 24, preferably extending both above and below the vertical extents of the base linear portion 24. This ensures that a tilted scan line, either 28 or 30, that would otherwise cross the linear data portion 24 of the symbol 10 and miss the link flag 4, will not miss the extended height link flag 26. A small vertical extension of the link flag 26 ensures that any tilted but usable scan line will capture the link flag.

In the above-described embodiments the 2D bar code included an internal link-flag, separate from the link flag 4 of FIG. 1 or the link flag 26 of FIG. 2. However, if other symbologies that do not have internal linking schemes are used, Composite code of the present invention will work equally well if either the external link-flag 26 of FIG. 2 is extended up to the top edge of the 2D bar code portion, or a separate external link flag is used for the 2D portion. In other embodiments, element 6 of FIG. 1 and element 22 of FIG. 2 could be a 1D bar code.

The decoder can be programmed to verify that a detected linkage flag is approximately the correct distance from the body of the linear symbol (the nominal distance being the defined size of that symbol's Quiet Zone), to minimize false recognition of graphics patterns.

Again to minimize false recognition of graphics patterns, a "voting" algorithm, similar to that described above for the no-flag-detected case, could also be applied to the flag-detected case.

The preferred embodiment of the invention has been described above. It should be obvious to one skilled in the art that other embodiments including modifications of the present invention are possible without departing from the spirit of the invention.

I claim:

1. A composite indicia readable by electro-optical readers, comprising:
   a) a first, machine-readable component encoded with first information according to a first symbology;
   b) a quiet zone devoid of indicia and located outside the first component;
   c) a second, machine-readable component in a non-overlapping relationship with the first component and encoded with second information according to a second symbology, the second component being encoded with internal flag information for identifying a presence of the first component and a type of the first symbology used; and
   d) a machine-readable flag located outside the quiet zone and encoded with external flag information for identifying a presence of the second component and a type of the second symbology used.

2. The indicia of claim 1, wherein the first component is a one-dimensional symbol, and wherein the second component is a two-dimensional symbol.

3. The indicia of claim 2, wherein the one-dimensional symbol is a Code 39 bar code symbol, and wherein the two-dimensional symbol is a MicroPDF 417 bar code symbol.

4. The indicia of claim 1, wherein the first component is a one-dimensional bar code symbol having leading and trailing regions at opposite ends of the symbol, and wherein the quiet zone is one of said regions.

5. The indicia of claim 1, wherein the first component is a one-dimensional bar code symbol having upper and lower regions above and below the symbol, and wherein the second component is located at one of said regions.

6. The indicia of claim 1, wherein the flag information is encoded according to the first symbology of the first component.

7. The indicia of claim 6, wherein the first component and the flag are one-dimensional bar code symbols spaced apart along a linear path.

8. The indicia of claim 7, wherein the first component has bars of a predetermined height, and wherein the flag has bars of the same predetermined height.

9. The indicia of claim 7, wherein the first component has bars of a predetermined height, and wherein the flag has bars of a height greater than the predetermined height.

10. A method of encoding information into a composite indicia readable by electro-optical readers, comprising the steps of:
    a) encoding first information according to a first symbology in a first, machine-readable component of the indicia;
    b) locating a quiet zone devoid of indicia outside the first component;
    c) encoding second information according to a second symbology in a second, machine-readable component of the indicia;
    d) positioning the components in a non-overlapping relationship;
    e) encoding flag information in a machine-readable flag located outside the quite zone, the flag information encoding step including identifying a presence of the second component, and identifying a type of the second symbology used; and
    f) encoding the second component with internal flag information for identifying a presence of the first component and a type of the first symbology used.

11. A composite indicia readable by a first electro-optical reader having a first scan and by a second electro-optical reader having a second scan larger than the first scan, the composite indicia comprising;
    a) a first component encoded with first information according to a first symbology and readable by both the first and second readers;
    b) a quiet zone devoid of indicia and located outside the first component;
    c) a second component in a non-overlapping relationship with the first component and encoded with second information according to a second symbology and readable by the second reader; and
    d) a flag located outside the quiet zone and readable solely by the second reader, the flag being encoded with external flag information for identifying to the second reader a presence of the second component and a type of the second symbology used.

12. The indicia of claim 11, wherein the first component is a one-dimensional symbol, and wherein the second component is a two-dimensional symbol.

13. The indicia of claim 12, wherein the one-dimensional symbol is a Code 39 bar code symbol, and wherein the two-dimensional symbol is a MicroPDF 417 bar code symbol.

14. The indicia of claim 11, wherein the first component is a one-dimensional bar code symbol having leading and trailing regions at opposite ends of the symbol, and wherein the quiet zone is one of said regions.

15. The indicia of claim 11, wherein the first component is a one-dimensional bar code symbol having upper and lower regions above and below the symbol, and wherein the second component is located at one of said regions.

16. The indicia of claim 11, wherein the flag information is encoded according to the first symbology of the first component.

17. The indicia of claim 16, wherein the first component and the flag are one-dimensional bar code symbols spaced apart along a linear path.

18. The indicia of claim 17, wherein the first component has bars of a predetermined height, and wherein the flag has bars of the same predetermined height.

19. The indicia of claim 17, wherein the first component has bars of a predetermined height, and wherein the flag has bars of a height greater than the predetermined height.

20. The indicia of claim 11, wherein the second component is also encoded with internal flag information for identifying a presence of the first component and a type of the first symbology used.

\* \* \* \* \*